(12) United States Patent
Goto et al.

(10) Patent No.: US 10,175,504 B2
(45) Date of Patent: Jan. 8, 2019

(54) CONTACT LENS

(71) Applicant: MENICON CO., LTD., Nagoya-shi, Aichi (JP)

(72) Inventors: Yuji Goto, Kasugai (JP); Yuko Kimura, Nagoya (JP)

(73) Assignee: MENICON CO., LTD., Nagoya-shi (JP)

( * ) Notice: Subject to any disclaimer, the term of this patent is extended or adjusted under 35 U.S.C. 154(b) by 0 days.

(21) Appl. No.: 15/510,928

(22) PCT Filed: Oct. 1, 2015

(86) PCT No.: PCT/JP2015/078000
§ 371 (c)(1),
(2) Date: Mar. 13, 2017

(87) PCT Pub. No.: WO2017/056306
PCT Pub. Date: Apr. 6, 2017

(65) Prior Publication Data
US 2018/0203251 A1 Jul. 19, 2018

(51) Int. Cl.
*G02C 7/04* (2006.01)
(52) U.S. Cl.
CPC .............. *G02C 7/048* (2013.01); *G02C 7/04* (2013.01)
(58) Field of Classification Search
CPC .................................. G02C 7/048; G02C 7/04
USPC ...................................................... 351/159.36
See application file for complete search history.

(56) References Cited

U.S. PATENT DOCUMENTS

| 5,100,225 A | 3/1992 | Rothe |
| 6,158,861 A | 12/2000 | Oyama et al. |
| 2011/0313077 A1 | 12/2011 | Baba et al. |
| 2015/0219926 A1 | 8/2015 | Fujikado et al. |

FOREIGN PATENT DOCUMENTS

| EP | 0980015 A1 | 2/2000 |
| EP | 2796920 A1 | 10/2014 |
| JP | S48-013048 U | 2/1973 |
| JP | H11-258553 A | 9/1999 |
| JP | 2000-089172 A | 3/2000 |
| JP | 2004-506925 A | 3/2004 |
| JP | 2011-219513 A | 11/2011 |

(Continued)

OTHER PUBLICATIONS

"Contact Lens Data Book Revised Edition 2," Association for Considering Contact Lenses, 2006, p. 83.

(Continued)

*Primary Examiner* — Wen Huang
(74) *Attorney, Agent, or Firm* — Oliff PLC

(57) ABSTRACT

To provide a contact lens with novel structure that is able to achieve both stability of the lens circumferential position in the worn state and improved wearing comfort at a high level. A first thick part and a second thick part are provided on a peripheral zone at both left and right sides such that each center-of-gravity position of both the first thick part and the second thick part is positioned below a horizontal diametrical line. A third thick part is provided on the peripheral zone below an optical zone. An upper thin part and a lower thin part are provided respectively at an upper peripheral zone positioned above the optical zone and a lower peripheral zone positioned below the optical zone and at an outer circumference side of the third thick part.

16 Claims, 6 Drawing Sheets

(56) References Cited

FOREIGN PATENT DOCUMENTS

| JP | 2013-164592 A | 8/2013 |
| WO | 2009/139021 A1 | 11/2009 |
| WO | 2013/093971 A1 | 6/2013 |
| WO | 2014/020634 A1 | 2/2014 |
| WO | 2014/050879 A1 | 4/2014 |
| WO | 2015/132889 A1 | 9/2015 |

OTHER PUBLICATIONS

Dec. 22, 2015 Search Report issued in International Patent Application No. PCT/JP2015/078000.

Apr. 3, 2018 International Preliminary Report on Patentability issued in International Patent Application No. PCT/JP2015/078000.

CONTACT LENS

TECHNICAL FIELD

The present invention relates to a contact lens used as overlapped on a cornea of a human eye, and particularly relates to a contact lens having a function of lens positioning in the circumferential direction when wearing.

BACKGROUND ART

With various types of contact lenses including soft types and hard types provided from the past, there are cases when it is necessary to do circumferential direction positioning when wearing, for the contact lenses having an optical zone for astigmatism correction, a near/distance optical zone for correcting presbyopia and the like. For example, with a toric lens used for astigmatism correction, high level, stable matching is required for the relative position of the eyeball astigmatic axis and the lens cylindrical axis. Also, for example in a multifocal lens for both near and far vision used for correcting presbyopia or the like, with lenses using a lens design for which the lens power distribution is not uniform in the circumferential direction around the optical center and the like, it is also necessary to have circumferential direction positioning. Also, with this kind of contact lens, it is necessary to have both stability of the lens circumferential direction position and improved wearing comfort of the lens when wearing.

As methods for positioning in the circumferential direction with the contact lens in a worn state, from the past, the truncation method noted in Patent Document 1, the prism ballast method noted in Patent Document 2, and the slab-off method noted in Patent Documents 3 and 4 are known. However, with these conventional methods, it was extremely difficult to satisfy the required level about both the contact lens circumferential direction positioning performance and wearing comfort.

Specifically, with the truncation method noted in Patent Document 1, the lens lower edge outer periphery with a linear shape in the chord direction is supported on the lower eyelid, but there is strong irritation by both end edges of the linear shape on the lower eyelid, so it was difficult to obtain good wearing comfort. Also, the prism ballast method noted in Patent Document 2 uses the gravitational effect by a prism shape, but the lens lower edge which is thick irritates the lower eyelid, so it was difficult to obtain good wearing comfort. Furthermore, the slab-off method noted in Patent Documents 3 and 4 uses a tightly-holding effect of the eyelid in relation to a thin part provided at the lens lower part or the both upper and lower parts, but when trying to ensure the tightly-holding volume by the eyelid to ensure the circumferential direction position performance, the lens size becomes big, and there was the problem that wearing comfort was easily degraded.

Meanwhile, disclosed in Patent Document 5 is the peri-ballast method that stabilizes the lens circumferential direction position using the balance of lateral thick parts and the gravitational effect by displacing the lateral thick parts provided on the lens peripheral zone downward and setting the lens center-of-gravity downward. Also, for this peri-ballast method, in Patent Document 6, the applicant of the present invention disclosed a constitution that allows improvement of both the lens circumferential direction position stability and better wearing comfort by adjusting the thickness change rate in both sides of the circumferential direction with the lateral thick parts.

However, with the conventional peri-ballast method as noted in Patent Documents 5 and 6, the fact that there is still room for improvement regarding the circumferential direction positioning effect became clear by the inventors of the present invention. Specifically, by doing a great deal of experimenting and investigating, the inventors of the present invention found that with the conventional peri-ballast method, based on the balance effect of the lateral thick parts, the contact lens tends to stabilize even in a worn state with the contact lens inverted vertically. Thus, there is a new problem of cases of not returning to the normal state with top and bottom positioning correct.

It was also newly understood that depending on the eyelid shape, pressure, and the like of each wearer, there are cases when there is great fluctuation of the circumferential direction position in the worn state from the target normal circumferential direction position.

To deal with this kind of newly discovered problem, the inventors of the present invention also investigated improving performance for returning from the inverted state to the normal state and suppressing fluctuation from the normal position by the gravitational effect by setting the downward center-of-gravity displacement amount to be big using the lateral thick parts. However, when attempting to handle this simply by making the downward center-of-gravity displacement amount big using the lateral thick parts, the maximum thickness dimension of the lateral thick parts is set to be large. As a result, it is impossible to avoid the problem of a decrease in wearing comfort, so this was not really an effective measure for addressing this.

BACKGROUND ART DOCUMENT

Patent Document

Patent Document 1: Japanese Unexamined Utility Model Publication No. JP-U-S48-013048

Patent Document 2: Japanese Domestic Publication of International Patent Application No. JP-A-2004-506925

Patent Document 3: Japanese Unexamined Patent Publication No. JP-A-H 11-258553

Patent Document 4: Japanese Unexamined Patent Publication No. JP-A-2000-089172

Patent Document 5: U.S. Pat. No. 5,100,225

Patent Document 6: International Publication No. WO 2009/139021

SUMMARY OF THE INVENTION

Problem the Invention Attempts to Solve

The present invention has been developed in view of the above-described matters as the background, and it is an object of the present invention to provide a contact lens with a novel structure which is able to improve both stability of the lens circumferential direction position in a worn state and lens wearing comfort to a higher level.

Means for Solving the Problem

The above and/or optional objects of this invention may be attained according to at least one of the following modes of the invention. The following modes and/or elements employed in each mode of the invention may be adopted at any possible optional combinations.

A first mode of the present invention provides a contact lens including an optical zone and a peripheral zone surrounding the optical zone, being characterized in that: a first thick part and a second thick part are provided on the peripheral zone at sections positioned at both left and right sides in a worn state of the contact lens such that each center-of-gravity position of both the first thick part and the second thick part is positioned below a horizontal diametrical line in the worn state; a third thick part is provided on the peripheral zone at a section positioned between the first thick part and the second thick part in a circumferential direction and below the optical zone in the worn state; and an upper thin part and a lower thin part whose thickness dimensions are smaller than thickness dimensions of the first to third thick parts are provided respectively at an upper peripheral zone positioned above the optical zone and a lower peripheral zone positioned below the optical zone and at an outer circumference side of the third thick part in the worn state.

With the contact lens of this mode, as a circumferential direction positioning effect in the worn state, in addition to a circumferential direction positioning effect based on a gravitational effect by both the first and second thick parts undergoing center-of-gravity downward displacement, a circumferential direction positioning effect based on a gravitational effect of the third thick part is also exhibited. In particular, the third thick part is positioned vertically below the optical zone in the normal position of the worn state, and the upper thin part is provided at a position vertically above and across the optical zone. As a result, the downward displacement of the lens center-of-gravity owing to the third thick part is efficiently realized, and the circumferential direction positioning effect based on the gravitational effect is even more effectively exhibited.

In fact, since the first and second thick parts are provided at both the left and right sides of the third thick part in the normal position of the worn state, the contact pressure (pressure force) on the lower eyelid of the third thick part is decreased by contact of the first and second thick parts on the lower eyelid. As a result, degradation of wearing comfort due to provision of the third thick part is also suppressed. In addition, with the lower thin part provided below the third thick part, there is a reduction or avoidance of the actual contact pressure by the lower eyelid on the third thick part. As a result, it is possible to achieve the effect of improving the circumferential direction positioning effect in the worn state described above while ensuring good wearing comfort.

With the contact lens of this mode described above, in regard to the third thick part, it is preferable to use at least one of the second to fifth modes noted below. By so doing, it is possible to even more effectively suppress adverse effects on the wearing comfort accompanying the newly provided third thick part.

A second mode of the present invention provides the contact lens according to the first mode, wherein a maximum thickness dimension of the third thick part is smaller than maximum thickness dimensions of the first and second thick parts.

A third mode of the present invention provides the contact lens according to the first or second mode, wherein a maximum thickness dimension of the third thick part is within a range of 0.2 to 0.3 mm.

A fourth mode of the present invention provides the contact lens according to any of the first to third modes, wherein in a vertical direction in the worn state, a maximum thickness position of the third thick part is set higher than a lower edge position of the same thickness as a maximum thickness of the third thick part with the first and second thick parts. More preferably with this mode, the maximum thickness position of the third thick part is set to be separated upward by 0.5 mm or greater from the lower edge position of the same thickness as the maximum thickness of the third thick part with the first and second thick parts.

A fifth mode of the present invention provides the contact lens according to any of the first to fourth modes, wherein in a lens radial direction, a maximum thickness position of the third thick part is set further on an inner circumference side than an outer peripheral edge position of the same thickness as a maximum thickness of the third thick part with the first and second thick parts. More preferably with this mode, the maximum thickness position of the third thick part is set further on the inner circumference side as separated by 0.5 mm or greater further in the radial direction inward than the outer peripheral edge position of the same thickness as the maximum thickness of the third thick part with the first and second thick parts.

Also, with the contact lens of each of the modes described above, in regard to the upper thin part, it is preferable to use at least either mode of the sixth and seventh modes noted below. By so doing, irritation on the upper eyelid is alleviated, and the downward setting of the lens center-of-gravity position is enabled while suppressing the thickness dimension of the first to third thick parts. This makes it possible to realize even higher levels of both wearing comfort and positioning performance.

A sixth mode of the present invention provides the contact lens according to any of the first to fifth modes, wherein a minimum thickness dimension of the upper thin part is smaller than a minimum thickness dimension of the lower thin part.

A seventh mode of the present invention provides the contact lens according to any of the first to sixth modes, wherein with the upper peripheral zone for which the upper thin part is provided that is positioned above the optical zone in the worn state, a maximum thickness dimension within a scope of 5.0 degrees each to left and right around a lens center axis from a vertical diametrical line in the worn state is 0.2 mm or less.

Furthermore, with the contact lens of each of the modes described above, in regard to the first and second thick parts, it is preferable to use at least one of the eighth or ninth modes noted below. By so doing, the maximum thickness dimension or the difference in the thickness dimension of each site of the lens is inhibited, thus further improving wearing comfort by reducing pressure irritation on the eyelid, while making it easier to control polymerization shrinkage during lens manufacturing.

An eighth mode of the present invention provides the contact lens according to any of the first to seventh modes, wherein each maximum thickness dimension of the first and second thick parts is 0.34 mm or less. More preferably with this mode, the maximum thickness dimension of the first and second thick parts is 0.30 mm or less.

A ninth mode of the present invention provides the contact lens according to any of the first to eighth modes, wherein each maximum thickness dimension of the first and second thick parts is set to be +0.2 mm or less in relation to an average thickness dimension of the circumferential direction at an outer peripheral edge part of the optical zone.

Furthermore, with the contact lens of each of the modes described above, in regard to the first and second thick parts, the tenth mode noted below can be preferably applied. By so doing, it is possible to have further improvement in the circumferential direction positioning stability during wearing while suppressing the thickness dimension of the first and second thick parts.

A tenth mode of the present invention provides the contact lens according to any of the first to ninth modes, wherein transition parts whose thickness dimensions become gradually smaller are provided at both circumference side parts of the first and second thick parts, and a thickness change rate at a first one of the transition parts positioned lower in the circumferential direction in the worn state is greater than a thickness change rate at a second one of the transition parts positioned higher in the circumferential direction in the worn state.

In addition, to the contact lens of each of the modes described above, any of the eleventh to fourteenth modes noted below can be preferably applied.

An eleventh mode of the present invention provides the contact lens according to any of the first to tenth modes, wherein in a vertical direction in the worn state, a displacement amount of a center-of-gravity position of an overall lens downward from a lens geometric center is 4% or greater in relation to a lens outer diameter dimension. With the contact lens of this mode, it is possible to more effectively achieve improvement in the circumferential direction position stability in the worn state.

A twelfth mode of the present invention provides the contact lens according to any of the first to eleventh modes, wherein an overall lens volume is 40 mm$^3$ or less. By newly using the third thick part according to the present invention, it is possible to improve the circumferential direction position stability while suppressing the maximum thickness dimension of the first and second thick parts. Consequently, it is possible to set a volume of 40 mm$^3$ or less by suppressing the lens overall maximum thickness dimension while ensuring good circumferential direction position stability, and thus to achieve more excellent wearing comfort.

A thirteenth mode of the present invention provides the contact lens according to any of the first to twelfth modes, wherein a prism ballast shape is set for a lens front surface and a lens back surface. With the contact lens of this mode, by using the prism ballast shape for which the lens is decentered by the lens back surface being shifted in parallel downward vertically in the worn state in relation to the lens front surface, it is possible to efficiently set thickening of the third thick part and thinning of the upper thin part.

A fourteenth mode of the present invention provides the contact lens according to any of the first to thirteenth modes, wherein the first to third thick parts and the upper and lower thin parts have a linearly symmetrical shape in relation to a vertical diametrical line in the worn state. With the contact lens of this mode, the lens design and manufacturing are simplified, and it is possible to improve the circumferential direction stability using the lateral balance.

A fifteenth mode of the present invention provides the contact lens according to any of the first to fourteenth modes, wherein the contact lens is any of a toric lens, a bifocal lens, a multifocal lens, a color contact lens, or a myopia progression suppression lens.

With a toric lens used for astigmatism correction, or a bifocal lens which is for both near and far vision having two focal points, a multifocal lens having even more focal points, a color contact lens equipped with a colored area corresponding to the limbus or the like, a myopia progression suppression lens for adjusting the correction power of a specific site such as on the visual axis or the peripheral visual field or the like, high-level positioning and stability are required in the circumferential direction for the optical zone and the peripheral zone. For example, with a toric lens, high precision and stable matching are required for the relative position of the astigmatic axis of the eyeball and the cylindrical axis of the optical zone of the contact lens. Therefore, it is possible to advantageously use the present invention including each of the first to fourteenth modes for these lenses. By using the present invention, it is possible to improve the positioning precision of the lens circumferential direction in the worn state while ensuring good wearing comfort. As a result, the target eye optical system correction effect, the aesthetic or cosmetic effect, the myopia progression suppression effect or the like can be even more stably exhibited. It is also possible to use an optical zone that suitably combines toric, bifocal, multifocal, as well as spherical power, prism, colored area, correction power adjustment area for myopia progression suppression or the like, and such a lens is also included in this mode.

A sixteenth mode of the present invention relates to a contact lens set including a plurality of contact lenses according to any of the first to fifteenth modes which are assorted by different spherical lens powers set for the optical zones thereof, the contact lens set being characterized in that: a prism ballast shape is set for lens front surfaces and lens back surfaces of the contact lenses, and a prism amount is set to be greater corresponding to the spherical lens powers of the optical zones being greater at a minus side.

With the contact lens set according to this mode, by skillfully using the prism ballast shape considering the optical zone with different thickness distribution according to the spherical lens power, it is possible to efficiently realize the thickness distribution of the peripheral zone according to the present invention as noted in the first to fifteenth modes, in particular the setting of the third thick part and the upper thin part, to correspond to the difference in spherical lens power.

Effect of the Invention

With the contact lens constituted according to the present invention, in addition to the first and second thick parts, using the newly applied third thick part and upper thin part, downward displacement of the lens center-of-gravity is realized efficiently, and the circumferential direction positioning effect based on the gravitational effect or the like is more effectively exhibited. In fact, the pressure action of the third thick part on the lower eyelid is reduced or avoided by the first and second thick parts positioned at left and right and the lower thin part positioned on the lower side, so it is possible to also achieve good wearing comfort.

EMBODIMENTS FOR CARRYING OUT THE INVENTION

Figure 1:
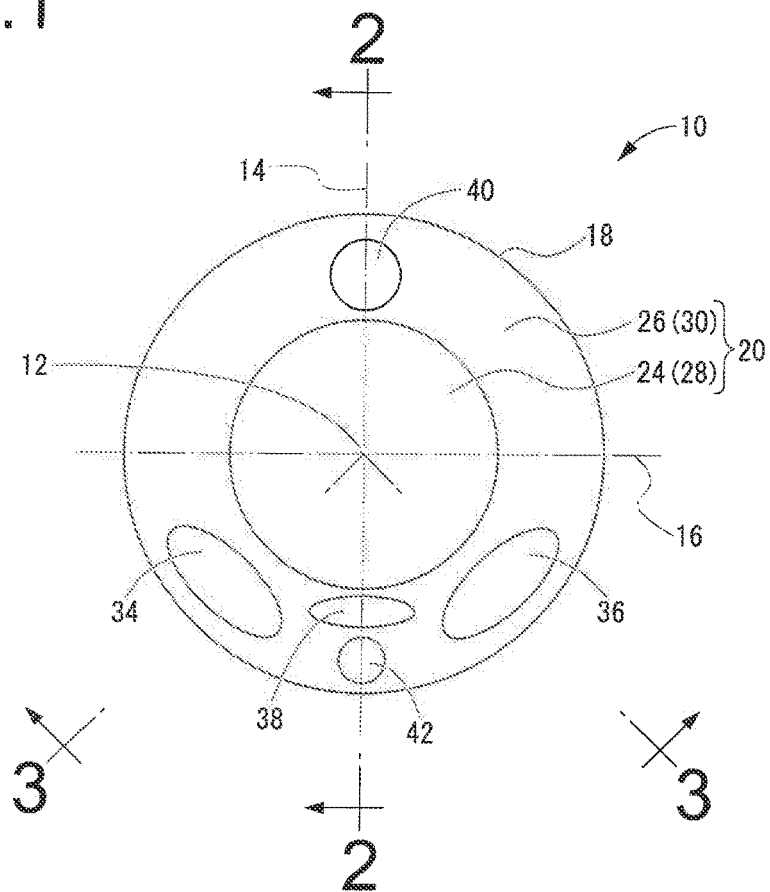
FIG. 1 is a specific front view depicting a contact lens as a first embodiment of the present invention.

Following, to make the present invention more specifically clear, we will give a detailed description of embodiments of the present invention while referring to the drawings.

Figure 2:
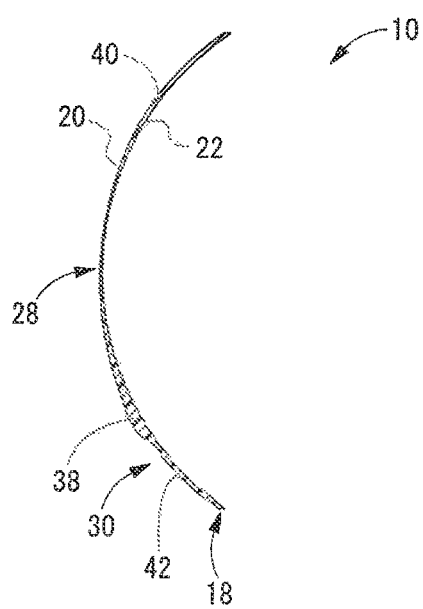
FIG. 2 is a view suitable for explaining a cross section with an exaggerated representation of a thickness dimension for a cross section taken along line 2-2 of FIG. 1.
Figure 3:
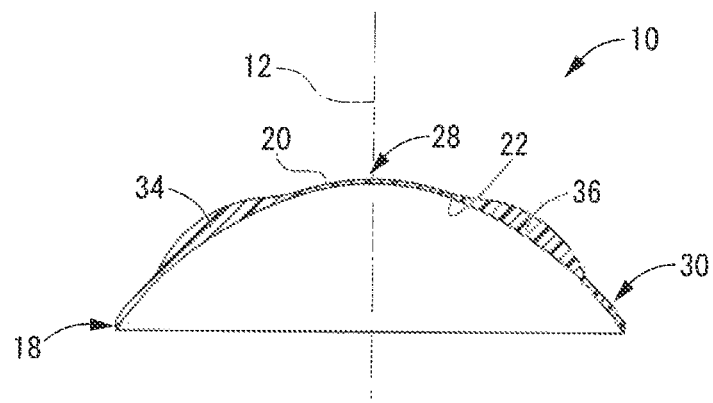
FIG. 3 is a view suitable for explaining about a cross section with an exaggerated representation of a thickness dimension for a cross section taken along line 3-3 of FIG. 1.

First, in FIGS. 1 to 3, a contact lens 10 is shown as a first embodiment of the present invention. FIGS. 1 to 3 are specific views to make the features of the present invention easy to understand, where FIG. 1 is a front view displaying a dividing line representing an optical zone, a peripheral zone, and each thickness setting area, and FIG. 2 and FIG. 3 are cross section views displaying thickness changes in exaggerated form. The contact lens 10, the same as contact lenses known well from the past, has an overall thin spherical crown shape, and is used by being worn overlapping the cornea surface on the eyeball. The present invention can be applied to any contact lens, whether soft type or hard type, and the material is not limited. For example, if it is a soft type contact lens, in addition to a hydrated material known from the past such as PHEMA (polyhydroxyethyl methacrylate), PVP (polyvinyl pyrrolidone) or the like, it is also possible to use a non-hydrated material or the like such as acrylic rubber, silicone or the like. Also, as the manufacturing method of the contact lens 10 as well, it is possible to use a contact lens manufacturing method well known from the past such as mold forming or machining, spin casting or the like.

In more specific detail, the contact lens 10 of this embodiment has a linearly symmetrical shape in relation to one vertical diametrical line 14 that passes through a lens geometric center axis 12 which is the center axis of the lens external shape. The contact lens 10 is designed such that in the normal circumferential direction position in the worn state, this vertical diametrical line 14 is in a vertical direction. Also, the design is such that a horizontal diametrical line 16, which is a diametrical direction line that passes through the lens geometric center axis 12 and is orthogonal to the vertical diametrical line 14, is horizontal in the normal position in the worn state.

Also, the contact lens 10 of this embodiment is equipped with an outer peripheral edge as an edge part 18 that has a circular shape with the front view shown in FIG. 1. Additionally, the contact lens 10 has a lens front surface 20 that is a roughly spherical convex surface, and a lens back surface 22 that is a roughly spherical concave surface. Here, for the lens back surface 22, it is possible to use any shape as the radial direction cross section shape, including a multi-order polynomial or conical shape or the like. However, in particular with this embodiment, the lens back surface 22 has a roughly arc shaped cross section that is concave and has a roughly fixed radius of curvature. Meanwhile, the lens front surface 20 is formed having an aspherical surface shape. The lens front surface 20 is constituted by a circular shaped optical zone front surface 24 having a designated diameter dimension, and a ring shaped peripheral zone front surface 26 having a designated radial direction width dimension, respectively in the front view. The peripheral zone front surface 26 is positioned surrounding the optical zone front surface 24, and is formed having concentric-circular inner and outer peripheral edge parts with the lens geometric center axis 12 as the center.

By so doing, in terms of structure, the contact lens 10 is constituted by an optical zone 28 for which a lens front surface is formed by the optical zone front surface 24, a peripheral zone 30 for which a lens front surface is formed by the peripheral zone front surface 26, and the edge part 18 that is positioned at the outermost peripheral edge part and connects the lens front and back surfaces.

With the contact lens 10 of this embodiment which is a soft contact lens, if the lens outer diameter dimension (DIA) is set to 12.0 to 16.0 mm, the peripheral zone 30 is preferably set to a size such that in the radial direction of the contact lens 10, it is held within a range of 0.1 mm to 4.0 mm from the lens outer periphery edge part, and more preferably, within a range of 0.2 mm to 3.6 mm from the lens outer periphery edge part. This is because if the peripheral zone 30 is in a range smaller than 0.1 mm from the lens outer periphery edge part in the lens radial direction, there is a risk of it being difficult to ensure lens strength and durability because with a thin part described later that is set on the peripheral zone 30, the proximity portion of the edge part for which the thickness is already small becomes even thinner. Meanwhile, if the peripheral zone 30 is in a range greater than 4.0 mm from the lens outer periphery edge part in the lens radial direction, the forming area of the optical zone 28 becomes small, and there is a risk of having an adverse effect on the vision correction effect and on visual performance.

Also, the optical zone front surface 24 constitutes the optical zone 28 that exhibits the target optical characteristics, working jointly with the lens back surface 22. The optical zone 28 is formed typically having an outer diameter dimension of 11 mm or less, and preferably 8 mm or less. In specific terms, to realize a lens power for a single focal point or multifocal points of two or more for example as the required optical characteristics such as a vision correction function or the like, a spherical surface or aspherical surface with a suitable radius of curvature is used.

Furthermore, it is possible to suitably use the present invention for toric lenses, bifocal lenses, multifocal lenses, color contact lenses, myopia progression suppression lenses and the like. By giving a high level of circumferential direction positioning characteristics with more stability, it is possible to more effectively realize the target characteristics for each of those lenses. For example with a toric lens, the relative matching characteristics between the eyeball astigmatic axis and the cylindrical axis of the contact lens optical zone is improved. With a bifocal lens or a multifocal lens, the matching characteristics between each focal area of the optical zone and the eye optical axis under various conditions is improved. With a color contact lens, for example, it is possible to improve the target cosmetic effect by stabilizing the overlapping of the ring shaped colored area for which decentering is set in relation to the lens geometric center (see WO2013/093971 and the like) on the cornea circumference edge area. With a myopia progression suppression lens, for example, the matching characteristics between an optical center axis for which decentering is set in relation to the lens geometric center (see WO2014/050879 and the like) and the human eye line of sight is improved, thereby improving the target myopia progression suppression effect and the visual performance. In this way, the present invention can be suitably applied to various types of contact lenses, but with this embodiment, we will show an example of applying to a contact lens for astigmatism correction which is a toric lens for which a cylindrical lens power is set for the optical zone. Specifically, with the contact lens for astigmatism correction of this embodiment, to give the required optical characteristics for astigmatism correction to the optical zone 28, at least at one of the front and back surfaces of the optical zone 28, a cylindrical lens surface is combined so as to exhibit a suitable cylindrical power while having a suitable cylindrical axis angle. In particular with this embodiment, a toric surface for which a specific radial direction axis is set in relation to the optical characteristics is formed at the optical zone front surface 24, and that optical zone front surface 24 and the lens back surface 22 work jointly so as to have the optical zone 28 as the toric lens. However, the optical zone 28 can also be for example, a bifocal lens that gives two focal points, a multifocal lens that gives multiple focal points of three focal points or more, and a contact lens for myopia progression suppression or the like. Moreover, it is also possible to apply this invention to a color contact lens equipped with a ring shaped colored area overlapping the cornea circumference edge at the peripheral zone 30.

Meanwhile, the peripheral zone 30 does not affect the contact lens 10 in the worn state on the cornea and thus the optical characteristics of the eye optical system. Therefore, the shape of the peripheral zone 30 can be set without being restricted according to the required optical characteristics. In light of that, so as to exhibit good positional stability during wearing and wearing comfort for the contact lens 10, the shapes of the front and back surfaces of the peripheral zone 30 are set according to the present invention.

First, a basic base shape is given to the peripheral zone 30. Here, as the basic front and back surface shape of the peripheral zone 30, any shape can be used, but considering design and production workability and the like, it is preferable to use a radial direction cross section shape defined, for example, by at least one of an arc shape or a curve consisting of a quadratic or higher polynomial function, a conic curve, or a spline curve, or a combination of these. With this embodiment, it is preferable to use a radial direction cross section shape wherein a curved line consisting of a quadratic or higher polynomial function, or a conic curve is suitably used for the peripheral zone front surface 26, while an arc shape is set for the lens back surface 22 including the peripheral zone back surface.

It is preferable that the lens front and back surfaces have a smooth surface shape with no inflection points anywhere, including the junctions that are the connection points of the optical zone 28, the peripheral zone 30, and the edge part 18. Specifically, it is preferable to have a smooth surface shape that is continuous without edge shaped inflection points by having the angle of inclination of the tangent line change continuously across essentially the entirety of the lens front surface 20 including each of the junctions and the area edges of the thick parts and the thin parts described later.

Also, at the outer peripheral edge of the optical zone 28 which is the inner circumference edge of the peripheral zone 30, regardless of what spherical lens power is set for the optical zone 28, there is a fixed thickness dimension across the entire circumference of the circumferential direction. Additionally, even in a case when a cylindrical lens power or a prism described later is set, for example with a typical cylindrical lens power setting range for which Cyl. P is 2.0 D or less or a prism amount setting range of Δ1 or less, the thickness change volume on the circumference of the outer peripheral edge of the optical zone 28 is a roughly fixed thickness dimension that does not reach 50 μm.

Also, on the assumption that the contact lens has the optical zone 28 for which the lens front and back surfaces are designed according to a conventional method considering the required optical characteristics and minimum thickness dimension, and the edge part 18 similarly designed considering strength characteristics and the minimum thickness dimension, the basic front surface shape of the peripheral zone 30 provides the peripheral zone front surface 26 reaching from the outer peripheral edge of the optical zone 28 to the edge part 18. Typically, the thickness dimension of the peripheral zone 30 is set so as to gradually become thinner from the inner circumference side toward the outer circumference side. Naturally, the inner circumference part of the peripheral zone 30 is a ring shaped transition area for which the surface shape and thus the thickness dimension change in the radial direction so as to realize smooth transition in the lens radial direction from the outer peripheral edge of the optical zone 24 toward the peripheral zone front surface 26 with the lens front surface 20. Typically, when a minus diopter spherical lens power is set for the optical zone 28, the thickness dimension is maximum at the position of the outer circumference side by the designated distance from the inner circumference edge of the peripheral zone 30.

Furthermore, for the peripheral zone 30 for which the base shape is given in this way, the thick parts and the thin parts according to the present invention are set by having partial differences in the thickness dimension according to the surface shape of the peripheral zone front surface 26. For the thick parts and the thin parts, so as not to have an adverse effect on the smooth transition surface that reaches from the optical zone 28 to the peripheral zone 30, it is desirable to set them at an area separated to the outer circumference side of a transition area set in the inner circumference part with the peripheral zone 30 as described above.

The thick parts and the thin parts described hereafter are parts made to be thick and parts made to be thin in relation to the base shape of the peripheral zone 30 set as described above. Naturally, since the base shape is a roughly fixed cross section shape across the entire circumference in the circumferential direction, it is possible to understand the thick parts and the thin parts as relative thickness areas. Also, regarding the base shape, since the radial direction thickness dimension of the peripheral zone 30 does not have a great dimensional change even in the radial direction, as long as there are not special optical characteristics such as a high plus level spherical lens power of plus 10 diopters or greater, for example, it is also possible to understand the thick parts and the thin parts as areas having a greater or less dimension than a specific thickness dimension.

In specific terms, in the normal position in the circumferential direction in the worn state shown in FIG. 1, a first thick part 34 and a second thick part 36 are provided at the sections positioned at the left and right sides in the drawing which is the horizontal direction. Besides, in the up and down direction in the drawing which is the vertical direction, a third thick part 38 is provided at the section positioned below the optical zone. Also, this third thick part 38 is positioned between the first thick part 34 and the second thick part 36 in the circumferential direction on the circumference of the peripheral zone 30.

In particular with this embodiment, the bottom edge of the third thick part 38 is set to be above the bottom edges of the first and second thick parts 34 and 36. Also, the top edges of the first and second thick parts 34 and 36 are set to be above the bottom edge of the optical zone 28. As a result, as shown in FIG. 1, the entirety of the third thick part 38 is set to be positioned between opposite parts in the lateral direction, i.e., the first thick part 34 and the second thick part 36.

Furthermore, in the vertical direction in FIG. 1 in the worn state, an upper thin part 40 is provided on the upper peripheral zone positioned above the optical zone 28. Also, a lower thin part 42 is provided at the lower peripheral zone positioned at the outer circumference side of the third thick part 38 below the optical zone 28.

FIGS. 1 to 3 specifically depict the shape, the size and the like of the aforementioned thick parts 34, 36, and 38 and thin parts 40 and 42, and the specific size, the outer circumference shape, the height and the like of the respective items are not limited. For example, it is also possible for the first and second thick parts 34 and 36 and the third thick part 38 to have a roughly fixed radial direction width dimension and roughly an arc shape that curves extending in the circumferential direction. Besides, it is also possible for the upper and lower thin parts 40 and 42 to have a non-circular shape.

Also, with the first and second thick parts 34 and 36, it is also possible to use the same kind of structure as the peri-ballast structure noted in Patent Document 5 and Patent Document 6, for example. For example, it is also possible to extend the upper circumferential direction edge further upward for the first and second thick parts 34 and 36 so that they extend to both the upper and lower sides straddling the horizontal diametrical line 16.

Here, with the first and second thick parts 34 and 36, for example by having the circumferential direction center position set below the horizontal diametrical line 16, or having the maximum height part displaced downward, the center-of-gravity position is also set to be below the horizontal diametrical direction line. Additionally, with this embodiment, the first and second thick parts 34 and 36 are in a laterally symmetrical form in relation to the vertical diametrical line 14, and the center-of-gravity of the first and second thick parts 34 and 36 is set on the vertical diametrical line 14.

Figure 4:
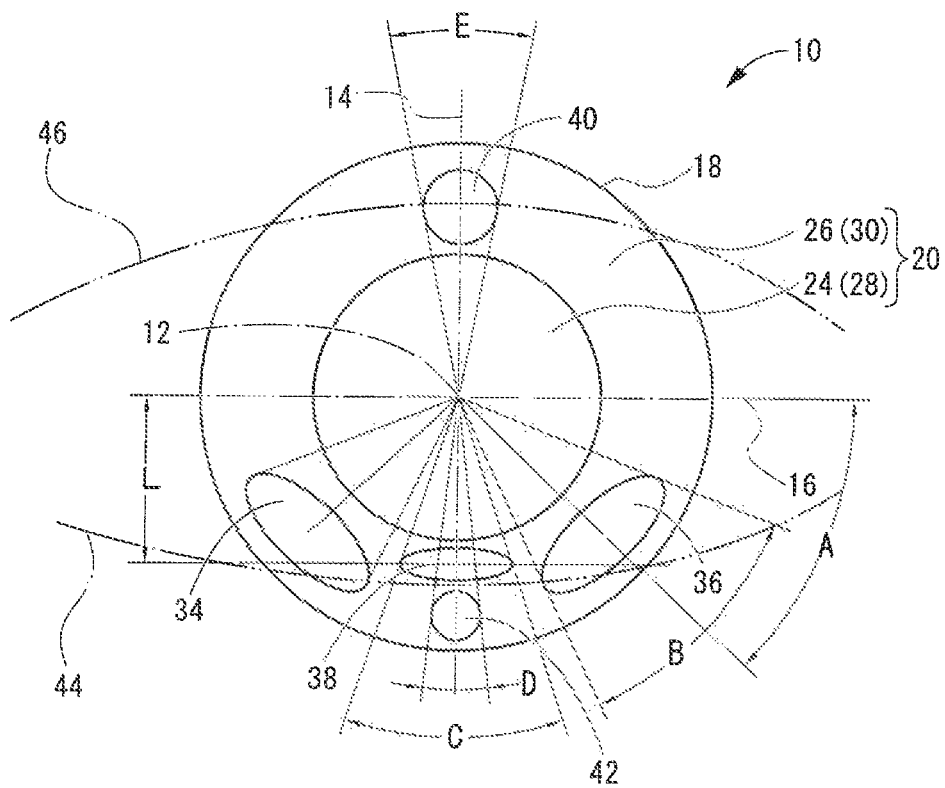
FIG. 4 is a view suitable for describing a thickness setting area of a peripheral zone of the contact lens shown in FIG. 1.

For the first and second thick parts 34 and 36, preferably, the displacement amount in the circumferential direction downward around the lens geometric center axis 12 shown by A in FIG. 4 is set to be within a range of 5 to 70 degrees. Also, the circumferential direction length around the lens geometric center axis 12 shown by B in FIG. 4 is preferably set within a range of 1 to 90 degree(s). If the value of this displacement amount A is less than 5 degrees, or the value of the circumferential direction length B is less than 1 degree, the ballast effect based on the downward setting of the center-of-gravity decreases, and it becomes difficult to obtain a rotation suppression effect based on the contact pressure of a lower eyelid 44 during wearing. Consequently, there is the risk of degradation of the circumferential direction positional stability. On the other hand, if the value of the displacement amount A exceeds 70 degrees, or the value of the circumferential direction length B exceeds 90 degrees, there is the risk that the contact pressure of the lower edge parts of the first and second thick parts 34 and 36 on the lower eyelid 44 during wearing will increase, thereby deteriorating the wearing comfort.

Furthermore, the third thick part 38 is of lateral symmetry in relation to the vertical diametrical line 14, and its center-of-gravity is set on the vertical diametrical line 14. Also, the vertical direction center position for the third thick part 38 preferably has the separation distance L on the vertical diametrical line 14 shown in FIG. 4 downward from the lens geometric center axis 12 set within a range of 3.5 to 6 mm. If the separation distance L is less than 3.5 mm, even if we assume a small diameter optical zone, there is the risk of affecting the optical characteristics by providing the third thick part 38. Also, if the separation distance L exceeds 6 mm, there is a risk that the third thick part 38 will easily touch the lower eyelid 44 during wearing, thus decreasing the wearing comfort.

For the third thick part 38, preferably, the circumferential direction length around the lens geometric center axis 12 shown by C in FIG. 4 is set within a range of 5 to 60 degrees. If the value of the circumferential direction length C is less than 5 degrees, the ballast effect based on the center-of-gravity setting downward is decreased, and this might lead to difficulty in obtaining the target circumferential direction positional stability. Meanwhile, if the circumferential direction length C exceeds 60 degrees, the forming areas of the first and second thick parts 34 and 36 on the left and right sides are restricted. As a result, there is the risk of problems such as the third thick part 38 directly contacting the lower eyelid 44 and thus decreasing the wearing comfort. Besides, this might decrease the circumferential direction positioning effect based on the support action by the lower eyelid 44 of the first and second thick parts 34 and 36.

Also, compared to the first and second thick parts 34 and 36, it is desirable that the third thick part 38 be set to have a smaller maximum thickness dimension. In addition to that, the bottom edge of the third thick part 38 is set to be above the lower edges of the first and second thick parts 34 and 36. Owing to these settings, in the worn state as shown in FIG. 4, the first and second thick parts 34 and 36 are supported by the lower eyelid 44, so there can be a reduction in contact pressure by the lower eyelid 44 on the third thick part 38. Therefore, it is possible to avoid a decrease in wearing comfort that comes with providing the third thick part 38.

Furthermore, since it is possible to expect similar action effects, in the vertical direction in the worn state, the position of the maximum thickness of the third thick part 38 is preferably set to be higher than the lower edge position of the same thickness as the maximum thickness of the third thick part 38 with the first and second thick parts 34 and 36. Also, for the same reason, in the lens radial direction, the radial direction position of the maximum thickness of the third thick part 38 is preferably set to be further on the inner circumference side than the radial direction position of the outer peripheral edge of the same thickness as the maximum thickness of the third thick part 38 with the first and second thick parts 34 and 36. The position of the maximum thickness of each of the first and second thick parts 34 and 36 is desirably positioned higher in the vertical direction in the worn state or further to the inner circumference side in the lens radial direction in relation to the position of the maximum thickness of the third thick part 38.

Meanwhile, with the goal of reducing the decrease in wearing comfort due to the pressure force applied to the lower eyelid 44 by the third thick part 38 when blinking or the like while trying to have an improvement effect of the circumferential direction positioning action based on the gravitational effect or the like by the third thick part 38, it is preferable that the maximum thickness dimension of the third thick part 38 be set within a range of 0.2 to 0.3 mm.

Also, with each of the first to third thick parts 34, 36, and 38, to suppress the uncomfortable feeling due to contact pressure on upper and lower eyelids 46 and 44 or catching when blinking or the like, it is desirable that the position at which the thickness dimension is at its maximum is set to be at roughly the center part, and the thick part is formed having a changing curve for the thickness dimension such as with a platform shape or mountain shape which slants so that the thickness dimension gradually becomes smaller toward the periphery. The maximum point of the thickness dimension can also be formed having a region of a designated area for each of the thick parts 34, 36, and 38.

Also, by the thickness dimension of the first to third thick parts 34, 36, and 38 being smaller toward the outer circumference from roughly the center part which is the maximum for each, there is a thickness dimension changing area that takes a valley form between the third thick part 38 and each of the first and second thick parts 34 and 36, specifically, between the respective maximum thickness dimension positions.

Meanwhile, the upper thin part 40 and the lower thin part 42 provided at the top and bottom of the optical zone 28 can be expected to have an effect of decreasing the pressure force on the upper and lower eyelids during wearing. Both thin parts are positioned on the vertical diametrical line 14 and broaden to both the left and right sides in a laterally symmetrical form. In FIG. 4, the thin parts are shown with a circular outer circumference shape, but the invention is not limited to this embodiment, and the upper and lower thin parts 40 and 42 are not limited in terms of their size relationship, either.

Also, for the upper and lower thin parts 40 and 42, the thickness dimension is not particularly restricted, and it is acceptable as long as the thickness dimension is small at the peripheral zone 30 given the base shape as described previously. An area whose thickness dimension is preferably 0.2 mm or less, and more preferably 0.15 mm or less is provided across a designated surface area.

In particular, it is preferable that compared to the lower thin part 42, the upper thin part 40 has a smaller minimum thickness dimension, and an area of a designated thickness dimension or less is set broadly therein. By so doing, it is possible to also contribute to improving the ballast effect by setting displacement to downward of the lens center-of-gravity position. The setting is based on a fact that the upper eyelid generally covers a broader area of the cornea than the lower eyelid. In light of this, the upper thin part 40 is formed with a smaller thickness or on a broader area, compared to the lower thin part 42. By so doing, the lens center of gravity is set to the lower side, thereby effectively improving the ballast effect. In addition, the irritation to the upper eyelid can be further alleviated, thereby enabling further improvement of wearing comfort.

From this kind of perspective, in the circumferential region around the lens geometric center axis 12 which has the vertical diametrical line 14 in FIG. 4 as its center, the circumferential direction length D of the lower thin part 42 is preferably set within a range of 5 to 40 degrees, and the circumferential direction length E of the upper thin part 40 is preferably set within a range of 10 to 180 degrees. Also, the relative relationship of the circumferential direction lengths of the upper and lower thin parts 40 and 42 is preferably D<E due to the reasons noted above.

In particular, with the lower thin part 42, it is possible to expect an effect of reducing pressure force on the lower eyelid 44 and suppressing a decrease in wearing comfort that comes with providing the third thick part 38. However, when the circumferential direction length D is less than 5 degrees, there is the risk that the pressure force reduction effect for the lower eyelid 44 will not be exhibited sufficiently, whereby there will be a problem of a decrease in wearing comfort due to contact of the lower eyelid 44 on the third thick part 38. Meanwhile, if the circumferential direction length D of the lower thin part 42 exceeds 40 degrees, there is the risk of an adverse effect on the ballast effect by setting to below the lens center-of-gravity. Additionally, the forming areas of the first and second thick parts 34 and 36 are limited, so that each lower edge setting position of the first and second thick parts 34 and 36 is pushed upward. This might cause an adverse effect also on the circumferential direction positioning characteristics by the support action of the lower eyelid 44 on each lower edge of the first and second thick parts 34 and 36.

Also, the upper thin part 40 contributes to setting to below the lens center-of-gravity, and reduces the pressure force on the upper eyelid 46 to improve wearing comfort. Moreover, it can contribute to returning to a normal worn state by reducing the positional stability in the inverted worn state when the lens is vertically inverted. Specifically, if the upper thin part 40 is not provided, the section of the peripheral zone 30 which extends in the upper area of the lens in the circumferential direction in the normal worn state is in a position along the lower eyelid 44 in the inverted worn state. It is thought that, where the section of that peripheral zone 30 is similar in shape to the lower eyelid 44 of the wearer, the support effect by the lower eyelid 44 is exhibited on the circumference of the peripheral zone, thereby leading to stabilization in the inverted worn state. Specifically, by providing the upper thin part 40, the section of the peripheral zone 30 extending in the circumferential direction along the lower eyelid 44 in the inverted worn state is divided and eliminated so that the support effect by the lower eyelid 44 is prevented. As a result, it is possible to effectively exhibit the circumferential direction positioning effect by the ballast effect and the like with an unstable lens circumferential direction position in the inverted worn state, thereby prompting a return to the normal worn state.

Also, with the upper thin part 40, when its circumferential direction length E is less than 10 degrees, there is the risk that the inhibition effect of the support state stabilized by the lower eyelid 44 in the inverted worn state will not be exhibited sufficiently. On the other hand, if the circumferential direction length E of the upper thin part 40 exceeds 180 degrees, there is the risk that there will be a decrease in the lens circumferential direction stabilizing effect by the alignment effect exhibited based on the contact effect of the upper eyelid 46 on the peripheral zone 30 in the normal worn state.

Specifically, by having the upper eyelid 46 cover and touch the section of the peripheral zone 30 positioned at the lens top side in the normal worn state, there is positional stabilization on the lens cornea based on the pressing effect by pressure of the upper eyelid 46 on the peripheral zone 30 extending in the circumferential direction. Also, by providing the upper thin part 40 on the peripheral zone 30, there is even more effective action of the pressing action by pressure of the upper eyelid 46 on the relatively thick parts at both side parts in the circumferential direction of the upper thin part 40. Thus, there is also an improvement in the circumferential direction positioning effect by lens rotation suppression. Effects such as lens position stabilization and rotation suppression based on this kind of upper eyelid pressure action have a risk of being difficult to exhibit effectively if the circumferential direction length E of the upper thin part 40 exceeds 180 degrees, as roughly the entire contact action area of the upper eyelid 46 on the peripheral zone 30 becomes the upper thin part 40.

When setting the upper and lower thin parts 40 and 42, together with setting of the first to third thick parts 34, 36, and 38, it is possible to design each area with the thickness dimension set for the base shape as a reference as described previously. However, so as to be able to more clearly set and understand the respective areas, for example, focusing on a specific reference thickness dimension (average thickness or design thickness, junction thickness or the like) set for the base shape, it is also suitable to recognize areas with different thickness dimensions compared to the reference thickness by a designated dimension or greater respectively for the plus side and the minus side as the thick parts 34, 36, and 38 and the thin parts 40 and 42.

As described above, with the contact lens 10 of this embodiment for which the first to third thick parts 34, 36, and 38 and the upper and lower thin parts 40 and 42 are provided at designated positions of the peripheral zone 30, based on the synergistic effect of the thick parts 34, 36, and 38 and the thin parts 40 and 42, it is possible to achieve both the circumferential direction positioning effect and wearing comfort at a high level. In particular, compared to when setting the lens center-of-gravity position downward only with the first and second thick parts 34 and 36, by providing the third thick part 38, it is even easier to set the lens center-of-gravity position downward. As a result, while obtaining the circumferential direction positioning effect based on the support effect by the lower eyelid 44 of the first and second thick parts 34 and 36, it is possible to further improve the circumferential direction positioning effect with the ballast effect by the gravitational effect on the lens center-of-gravity with displacement set downward. Besides, with the lower thin part 42 provided below the third thick part 38, the contact pressure of the lower eyelid 44 on the third thick part 38 is reduced, so it is possible to avoid degradation of wearing comfort due to the third thick part 38.

Furthermore, by providing the upper thin part 40, in addition to being able to improve the circumferential direction positioning effect by the ballast action with further easier downward setting of the lens center-of-gravity position, it is possible as well to realize the return action to the normal state by preventing stabilization in the inverted worn state with top and bottom reversed.

Also, in addition to the first and second thick parts 34 and 36, by also providing the third thick part 38 and the upper and lower thin parts 40 and 42 in this way, it is possible to improve the circumferential direction position stability. Therefore, for the first and second thick parts 34 and 36, by setting the maximum thickness dimension, the size and the like to be small while ensuring the circumferential direction position stability, whereby it is possible to further improve wearing comfort. As a result, for example by setting the lens overall volume to also be small, it is possible to even further improve the wearing comfort.

From this perspective, it is preferable with the first and second thick parts 34 and 36 to have the maximum thickness dimension be 0.34 mm or less, and to set it to be +0.2 mm or less in relation to the circumferential direction average thickness dimension at the outer peripheral edge part of the optical zone 28. Also, setting the overall lens volume to 40 mm³ or less is preferable in terms of improving wearing comfort. Considering the ballast effect due to gravity, with the lens overall center-of-gravity position, the displacement amount downward from the lens geometric center axis 12 is preferably set to 4% or greater in relation to the lens outer diameter dimension (DIA), by the settings of the thick parts 34, 36, and 38 and the thin parts 40 and 42.

Yet further, with this embodiment, by forming the thick parts 34, 36, and 38 and the thin parts 40 and 42 such that they have a smooth convex surface or concave surface, the wearing comfort is further improved. In particular with the first and second thick parts 34 and 36 for which the maximum thickness dimension is large, both circumference side parts of them are transition parts for which the thickness dimension becomes gradually smaller toward the circumferential direction end part. These transition parts further alleviate catching or resistance on the upper and lower eyelids 44 and 46 during blinking. In particular, out of the transition parts of both sides of the circumferential direction with the first and second thick parts 34 and 36, the thickness change rate at the transition part positioned lower in the circumferential direction in the worn state is preferably set to be greater than the thickness change rate at the transition part positioned higher in the circumferential direction in the worn state. By so doing, while reducing upper eyelid irritation on the upper side part in the circumferential direction of the first and second thick parts 34 and 36 for realizing good wearing comfort, it is possible to advantageously ensure the lens circumferential direction positioning effect by the support action of the lower eyelid 44 on the lower side part in the circumferential direction of the first and second thick parts 34 and 36.

To show a specific example of the thickness change rate (ratio of the thickness dimension change volume to the circumferential direction length) set for each transition part at both the upper and lower sides of the first and second thick parts 34 and 36, the upper side transition part is set preferably within a range from $0.10 \times 10^{-2}$ mm/angle to $1.0 \times 10^{-2}$ mm/angle, and more preferably within a range from $0.10 \times 10^{-2}$ mm/angle to $0.80 \times 10^{-2}$ mm/angle. By so doing, it is possible to set the upper side transition part thickness change rate as comparatively gentle, and to suppress irritation and the like due to contact of the upper eyelid while effectively ensuring the pressing action of the upper eyelid. On the other hand, the lower side transition part is set preferably within a range from $0.30 \times 10^{-2}$ mm/angle to $1.50 \times 10^{-2}$ mm/angle, and more preferably in a range from 0.30×10-2 mm/angle to $1.10 \times 10^{-2}$ mm/angle. If the tilt is too gentle because the lower side transition part thickness change rate is too small, it becomes difficult to obtain the lens rotation prevention effect by contact of the lower side transition part on the upper edge of the lower eyelid. On the other hand, if the tilt is too steep because the lower side transition part thickness change rate is too great, there is the risk of giving unnecessary rotation or an uncomfortable feeling due to catching on the upper eyelid when blinking.

Figure 5:
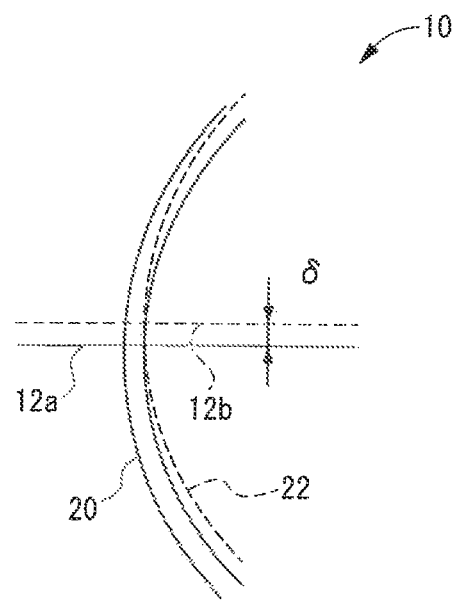
FIG. 5 is a view suitable for describing a prism amount setting of the contact lens shown in FIG. 1.

With the contact lens 10 of this embodiment as described above, as specifically shown and illustrated in FIG. 5, by further shifting (moving relatively parallel) each geometric center axis 12a or 12b of the lens front surface 20 and the lens back surface 22 vertically by a designated displacement amount 8, a prism can be set on the optical zone 28. Thus, it is possible to also set a prism ballast shape for the front and back surfaces 20 and 22 of the entire lens.

Specifically, with the contact lens 10 of this embodiment for which the first to third thick parts 34, 36, and 38 and the upper and lower thin parts 40 and 42 are set on the peripheral zone 30 as described above, for example, by further implementing prism setting that shifts the lens back surface 22 relatively upward in relation to the lens front surface 20, it is possible to make the lens overall thickness dimension thicker from the upper side to the lower side. As a result, particularly in addition to efficiently giving thickness to the third thick part 38 positioned below the optical zone 28, it is also possible to efficiently make thinner the upper thin part 40 positioned above the optical zone 28. Therefore, by using this kind of prism ballast shape, while maintaining the basic optical characteristics (except the prism amount) of the optical zone 28, utilizing the predesigned shape of the lens front and back surfaces 20 and 22, it is possible to adjust the thickness of the first to third thick parts 34, 36, and 38 and the upper thin part 40 and efficiently tune relative settings. Thus, it is possible to easily adjust the displacement amount of the lens center-of-gravity position.

When using the prism ballast shape, from the point of avoiding excessive thinning or thickening in addition to suppressing the effect of the prism on the optical characteristics, it is preferable that the prism amount for the optical zone 28 be 2.0Δ or less, and more preferable that it be 1.0Δ or less.

Also, using this kind of prism ballast shape is suitable for a contact lens series assorted by a suitable power interval such as 0.5 D (diopters) for the spherical lens power P of the optical zone 28, for example. Specifically, the contact lenses provided to the market are required to accommodate variety of ocular refractive power that differs for each individual. In an attempt to meet the requirement, the contact lenses are assorted by the spherical lens power P varying at appropriate power intervals, with a prescribed whole range, e.g., from +5 to −10 D. The assorted contact lenses are provided for the market as a series of contact lenses with substantially the same material and fundamental design concept.

In light of that, for example with a minus diopter spherical lens power, when designing the front and back surfaces of the optical zone 28 so as to be able to ensure a designated value for center thickness Tc which is the minimum thickness of the optical zone 28, the thickness dimension of the outer peripheral edge part of the optical zone 28 becomes larger as the spherical lens power P becomes greater in the high minus range. Therefore, there is a difference in the thickness dimension and the base shape of the peripheral zone 30 provided at the outer circumference side of the optical zone 28 between the contact lenses of all the spherical lens powers constituting the series. In light of that, for example in correspondence to the spherical lens power P of the optical zone 28 becoming greater to the minus side, using a prism amount that displaces the lens back surface 22 upward relative to the lens front surface 20, or making it bigger is also effective. By so doing, it is possible to efficiently realize suppressing the occurrence of thick areas on the section of the peripheral zone 30 positioned above the optical zone 28 along with setting of high minus spherical lens powers, for example, or setting the thickness dimension of the upper thin part 40 to be small. It is also possible to set a large thickness dimension for each of the first to third thick parts 34, 36, and 38 positioned below the optical zone 28 relative to the section of the peripheral zone positioned above the optical zone 28, thereby efficiently ensuring setting of displacement to downward of the lens center-of-gravity position.

Above, we gave a detailed description of embodiments of the present invention, but these are nothing more than examples, and the present invention is not to be interpreted as being limited in any way by the specific descriptions of those embodiments.

For example, the specific optical characteristics, geometric shapes and the like in the aforementioned embodiments are nothing more than examples, and it is possible to design the contact lenses of this invention such that they are able to handle diverse optical characteristics, geometric shapes and the like required by a large number of contact lens users. Also, with the aforementioned embodiments, the thick parts 34, 36, and 38 and the thin parts 40 and 42 were formed by shape setting on the lens front surface 20, but it is also possible to form the thick parts and the thin parts by doing shape setting of the lens back surface while using a spherical surface shape for the lens front surface. Furthermore, it is also possible to design a lens such that the thickness changes for forming the thick parts and the thin parts are shared by the lens front surface and the lens back surface.

Specifically, with the contact lens, when realizing the optical characteristics of the optical zone, the peripheral zone stabilization shape and the like, as shown in the embodiments noted above, while using a sagittal plane that has, as the base curve, the radius of curvature corresponding to the cornea radius of curvature for the lens back surface, providing the thick parts and the thin parts with various types of conic curves, multidimensional curves or the like set as the cross section shape for the lens front surface so as to realize the target optical zone optical characteristics, the peripheral zone stabilization shape and the like is one approach. However, for example from the point of view of contact lens design engineers, with the back surface of the contact lens, while using the lens front surface as a reference surface consisting of a designated conic curve or the like, giving the target optical characteristics to the optical zone by suitably designing the shape of the lens back surface is well known technology (e.g. see "Contact Lens Data Book Revised Edition 2," page 83 edited by Association for Considering Contact Lenses). In the same way, by suitably setting the shape of the lens back surface for the peripheral zone as well, it is also possible to set the thick parts and the thin parts in the same way as the embodiments noted above. Which of the lens front surface and the lens back surface of the contact lens to set each thick part or each thin part in is selected as appropriate considering the manufacturing method of the contact lens, because it also relates to required kinds of mold and the like. Also, in the case of soft contact lenses, the contact lens deforms to follow the cornea shape during wearing, whichever front/back surface the shape is set on, so there is almost no effect on wearing comfort or the like. Also in the case of hard contact lenses, since the thickness change volume of the thick parts and the thin parts is small, the gap between the cornea and the lens is filled with lacrimal fluid, so that there is very little effect on wearing comfort and the like.

Also, including the first and second thick parts 34 and 36 provided at the left and right of the lens, the peripheral zone 30 does not have to be a symmetrical shape. For example, since there is a tendency for the distance between facing parts of the upper and lower eyelids with the human eye to be smaller on the nose side than the ear side in the normal open eye state. In correspondence to that, the first or second thick part circumference length (central angle) positioned at the nose side in the lens wearing state can be set to be smaller than the first or second thick part circumference length (central angle) positioned at the ear side. By this setting, it is possible as well to further improve wearing comfort and the circumferential direction position precision by eyelid action. Also, considering the typical angle of inclination of the upper and lower eyelids with the human eye, it is also possible to design the contact lens with the outer circumference shape of the thick parts and the thin parts being laterally asymmetrical, or to have an extension only on one side in the circumferential direction with respect to the thick parts and the thin parts.

Yet further, not only for the optical zone optical characteristics, but for the outer circumference shape as well, it is not absolutely necessary to be symmetrical in relation to the vertical diametrical line 14 or the horizontal diametrical line 16. For example, with a bifocal lens or the like, it is possible to set the near region in relation to the distance region to be displaced to the nose side during wearing of the lens or the like, and with that kind of contact lens, even for an item for which the peripheral zone radial direction width dimension changes and is not fixed on the circumference, it is possible to use the thick parts and thin setting structure according to the present invention.

In addition, though we won't list individual items, the present invention can be embodied with embodiments to which various changes, revision, improvements and the like have been added based on the knowledge of a person skilled in the art. It goes without saying that any of such embodiments are included within the scope of the present invention as long as they do not stray from the gist of the present invention.

EXAMPLE 1

Example and Comparative Example respectively underwent trial production and preparation for contact lenses constituted according to the present invention, and the results of a comparison investigation regarding circumferential direction position stability during wearing and wearing comfort are shown below.

Figure 6:
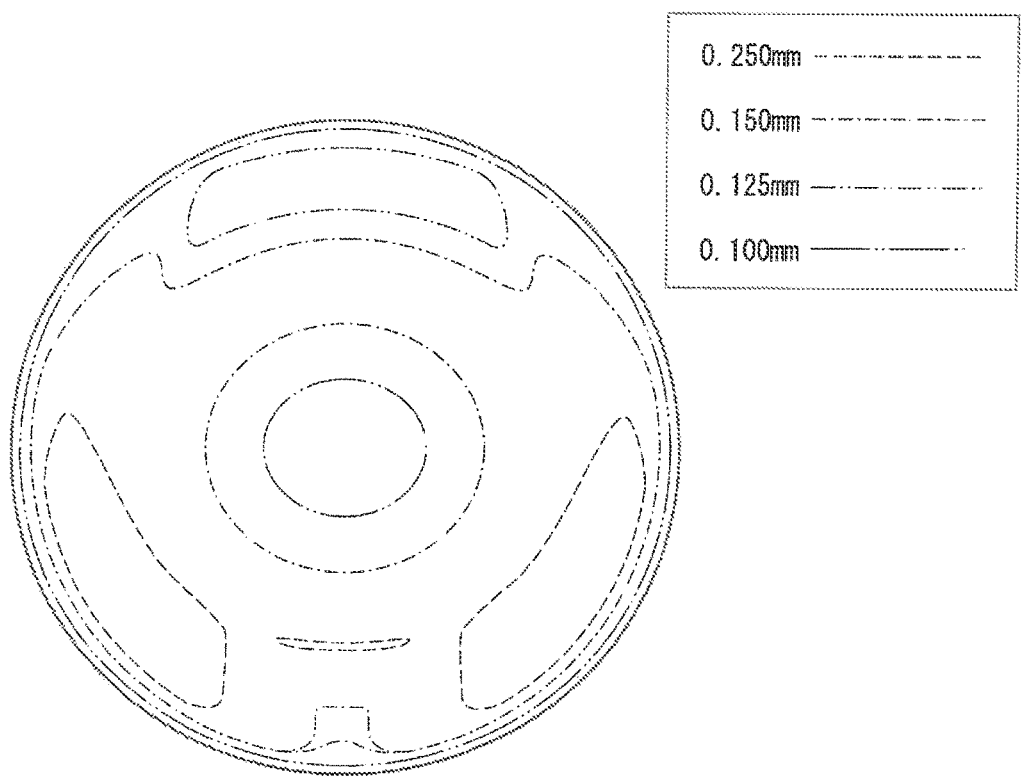
FIG. 6 is a contour diagram showing a thickness distribution of a contact lens as Example with a constitution according to the present invention.
Figure 7:
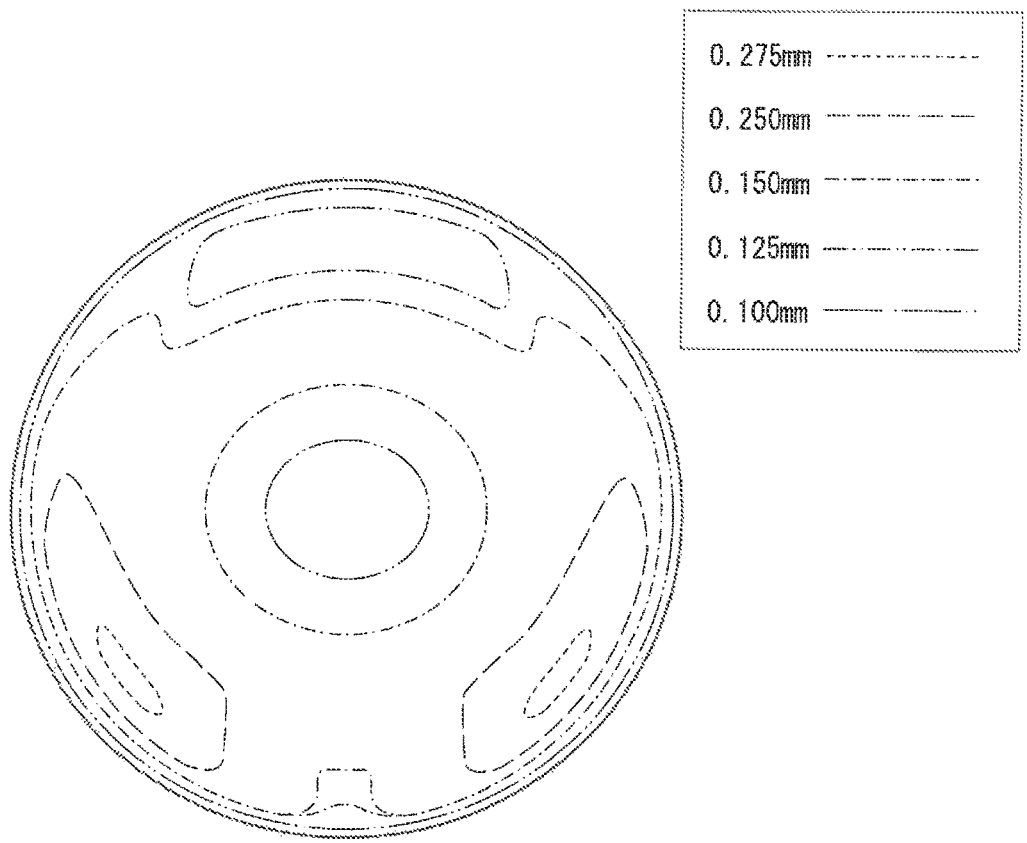
FIG. 7 is a contour diagram showing a thickness distribution of a contact lens as Comparative Example.

Table 1 shows the contact lenses as the prepared Example and Comparative Example. Also, for the contact lenses as Example and Comparative Example, FIG. 6 and FIG. 7 show the thickness dimension distribution with contour lines.

The forming material for each contact lens is silicone hydrogel, and used were polymer materials containing the well known silicon compound noted in Japanese Unexamined Patent Publication No. JP-A-2011-219513; polymerizable compounds having an acryloyloxy group; a polymer material including polymers including polymerizable compositions having an amide group and a nonionic surfactant. Also, the contact lenses for Example and Comparative Example were obtained by doing mold forming using that polymer material. Incidentally, the water content for Example and Comparative Example contact lenses was 56%, and the Dk 10 value representing the oxygen permeability was $64 \times 10^{-11}$ $(cm^2/sec) \cdot (mL \cdot O_2 (STP)/mL \cdot mmHg)$.

Also, the major standard values and the like for contact lens of Example and Comparative Example were set to be mutually the same as shown in Table 1. Yet further, the values of A to E and L in Table 1 showing the thick parts and the thin parts for the peripheral zone are the setting values corresponding to A to E and L in FIG. 4.

As can be understood from Table 1, in comparison to Example for which the first to third thick parts and the upper and lower thin parts are set according to the present invention, Comparative Example used a structure without the third thick 20 part provided. With Comparative Example, as a substitute for providing the third thick part, by setting the maximum thickness dimension of the first and second thick parts to be greater than that of Example, the displacement amount to downward of the lens center-of-gravity was made to be a value close to that of Example equipped with the third thick part. Also, the center-of-gravity position Gy in Table 1 is a value of ((center-of-gravity displacement distance from the geometric center axis downward)/(lens outer diameter dimension))×100. With FIG. 6 and FIG. 7, the contour lines are selectively displayed to display the difference between Example and Comparative Example in an easily understandable way.

TABLE 1

| Lens Specification | Same for Example and Comparative Example | | |
|---|---|---|---|
| | B.C. (mm) | 8.40 | |
| | Sph. P. (D) | −7.00 | |
| | Cyl. P. (D) | −1.25 | |
| | Dia. (mm) | 14.2 | |
| | Axis (°) | 180 | |
| | C.T. (mm) | 0.08 | |

| | | Example | Comparative Example |
|---|---|---|---|
| Thickness | Left/right thick parts (mm) | 0.3 (max. thickness) | 0.35 (max. thickness) |
| | Third thick part (mm) | 0.25 (max. thickness) | None |
| | Upper thin part (mm) | 0.12 (min. thickness) | 0.12 (min. thickness) |
| | Lower thin part (mm) | 0.16 (min. thickness) | 0.16 (min. thickness) |
| Area Setting | A (°) | 40 | 40 |
| | B (°) | 25 | 25 |
| | C (°) | 45 | — |
| | D (°) | 10 | 10 |
| | E (°) | 70 | — |
| | L (mm) | 4.3 | 4.3 |
| Attributes | Center-of-gravity position Gy (%) | 4.4 | 3.7 |
| | Volume (mm³) | 37.6 | 41.1 |
| | Prism (Δ) | 0.5 | 0.5 |
| Evaluation Results | Return when worn as inverted (%) | 86.7 | 63.3 |
| | Axial tilt within ±5° (eye) | 15 | 9 |

Using the contact lenses like these of Example and Comparative Example, as subject eyes, a total of 30 eyes with both eyes of 15 subjects tried on both Example and Comparative Example in a random order. Then, the subjects did not know which they were wearing. Evaluation was done respectively for circumferential direction positional stability, wearing comfort, and return performance to the normal wearing state from the inverted wearing state with top and bottom reversed. The evaluation results are shown together in Table 1.

First, regarding wearing comfort, though not shown in Table 1, a significant difference was not found for Example and Comparative Example. From the test results, with Example for which the third thick part was provided, the result was an evaluation for which good wearing comfort was obtained at roughly the same level as Comparative Example for which the third thick part was not provided.

Next, regarding the return performance from the inverted wearing state with top and bottom reversed, it was confirmed whether rotation was found at 90 degrees or greater after one minute from wearing. When rotation of 90 degrees or greater was found, this was recognized as an item that returns to the normal state by gravitational effect after that. From the test results in Table 1, with Example, 86.7% were found to return to the normal state, and compared to 63.3% with Comparative Example, this was evaluated as exhibiting excellent return performance.

Also, in regard to circumferential direction positional stability, regarding contact lenses worn on the left and right eyes of the test subjects from the point when 15 minutes elapsed from wearing, actual measurements were taken of the fluctuation displacement angle in the circumferential direction around the central axis, five times each alternately, and the average of the actual measurement values of those five times was used as the measurement value. That fluctuation displacement angle is measured as the rotation angle by which the vertical diametrical line 14 of the design was shifted in the circumferential direction from the actual vertical direction on the cornea. From the test results in Table 1, with Example, for 50% (15 eyes out of a total of 30 eyes), the fluctuation displacement angle was suppressed to within ±5 degrees or less. Compared to 30% (9 eyes out of a total of 30 eyes) with Comparative Example, the evaluation was that excellent circumferential direction position stability performance was exhibited by fluctuation suppression.

EXAMPLE 2

For the contact lens set made into a series with a combination of items for which different spherical lens powers were set for the optical zones of the contact lenses constituted according to the present invention, a simulation was done of the effectiveness of setting different prism amounts corresponding to differences in spherical lens power. In specific terms, when the spherical lens powers P set for the optical zones were −5.00 D, −8.00 D, and −10.00 D, for cases of using prism ballast shapes with different prism amounts, the results are shown in FIG. 8 with differences in the thickness dimension of each site shown by contour lines.

With lenses for which the spherical lens power is the same but the prism amount is different, with the lens front and back surface shape mutually the same, the lens front surface and the lens back surface were displaced in relation to each other.

Figure 8:
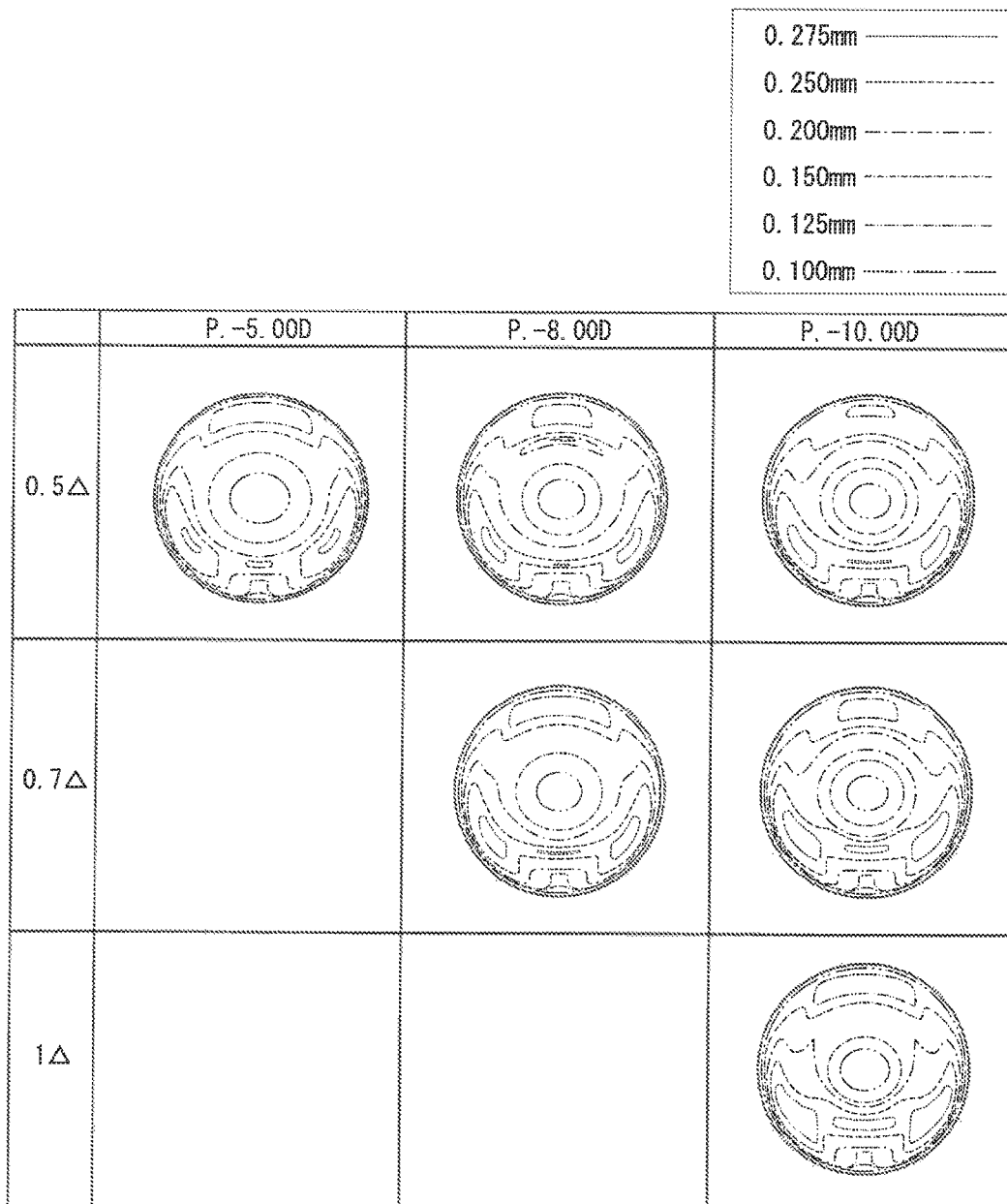
FIG. 8 is a contour diagram showing a thickness distribution of each contact lens for which a prism amount setting is different for each spherical lens power set for an optical zone with Example of a contact lens set constituted according to the present invention.

With the simulation results shown in FIG. 8, first, when looking at contact lens of each spherical lens power for which the prism amount was the same at 0.5Δ, the more it goes to a high minus power such as from −5.00 D to −8.00 D and further to −10.00 D, there is a tendency for the thickness dimension size and the area size of the section of the peripheral zone positioned above the optical zone to become large. It is also possible that this upper thick section might suppress the ballast effect owing to the setting by which the center-of-gravity is set to the lower side.

In comparison to this, even with contact lenses of high minus power of −8.00 D or −10.00 D, by setting the prism amount to be large at 0.7Δ or 1Δ, the size and area of the thickness dimension of the peripheral zone positioned above the optical zone are kept small. Including an increase in the lower third thick part thickness dimension or area, the relative difference in the thickness dimension between top and bottom is marked, and an improvement in the ballast effect by setting to below the center-of-gravity is acknowledged.

From this, with the contact lens series having a suitable power interval for the spherical lens power P of the optical zone 28, it is possible to understand that the peripheral zone thickness setting according to the present invention using the prism ballast shape is effective. With the simulation shown in FIG. 8, the prism amount was changed for each spherical lens power, but for example in a range of spherical lens powers approaching e.g., −7.00 D and −8.00 D or the like, it is also possible to set the same prism amount.

KEYS TO SYMBOLS

10: Contact lens; 12: Lens geometric center axis; 14: Vertical diametrical line; 16: Horizontal diametrical line; 20: Lens front surface; 22: Lens back surface; 28: Optical zone; 30: Peripheral zone; 34: First thick part; 36: Second thick part; 38: Third thick part; 40: Upper thin part; 42: Lower thin part

The invention claimed is:
1. A contact lens comprising: an optical zone; and a peripheral zone surrounding the optical zone, wherein
a first thick part and a second thick part are provided on the peripheral zone at sections positioned at both left and right sides in a worn state of the contact lens such that each center-of-gravity position of both the first thick part and the second thick part is positioned below a horizontal diametrical line in the worn state,
a third thick part is provided on the peripheral zone at a section positioned between the first thick part and the second thick part in a circumferential direction and entirely below the optical zone in the worn state, and
an upper thin part and a lower thin part whose thickness dimensions are smaller than thickness dimensions of the first to third thick parts are provided respectively at an upper peripheral zone positioned above the optical zone and a lower peripheral zone positioned below the optical zone and at an outer circumference side of the third thick part in the worn state.

2. The contact lens according to claim 1, wherein a maximum thickness dimension of the third thick part is smaller than maximum thickness dimensions of the first and second thick parts.

3. The contact lens according to claim 1, wherein a maximum thickness dimension of the third thick part is within a range of 0.2 to 0.3 mm.

4. The contact lens according to claim 1, wherein in a vertical direction in the worn state, a maximum thickness position of the third thick part is set higher than a lower edge position of the same thickness as a maximum thickness of the third thick part with the first and second thick parts.

5. The contact lens according to claim 1, wherein in a lens radial direction, a maximum thickness position of the third thick part is set further on an inner circumference side than an outer peripheral edge position of the same thickness as a maximum thickness of the third thick part with the first and second thick parts.

6. The contact lens according to claim 1, wherein a minimum thickness dimension of the upper thin part is smaller than a minimum thickness dimension of the lower thin part.

7. The contact lens according to claim 1, wherein with the upper peripheral zone for which the upper thin part is provided that is positioned above the optical zone in the worn state, a maximum thickness dimension within a scope of 5.0 degrees each to left and right around a lens center axis from a vertical diametrical line in the worn state is 0.2 mm or less.

8. The contact lens according to claim 1, wherein each maximum thickness dimension of the first and second thick parts is 0.34 mm or less.

9. The contact lens according to claim 1, wherein each maximum thickness dimension of the first and second thick parts is set to be +0.2 mm or less in relation to an average thickness dimension of the circumferential direction at an outer peripheral edge part of the optical zone.

10. The contact lens according to claim 1, wherein transition parts whose thickness dimensions become gradually smaller are provided at both circumference side parts of the first and second thick parts, and a thickness change rate at a first one of the transition parts positioned lower in the circumferential direction in the worn state is greater than a thickness change rate at a second one of the transition parts positioned higher in the circumferential direction in the worn state.

11. The contact lens according to claim 1, wherein in a vertical direction in the worn state, a displacement amount of a center-of-gravity position of an overall lens downward from a lens geometric center is 4% or greater in relation to a lens outer diameter dimension.

12. The contact lens according to claim 1, wherein an overall lens volume is 40 mm$^3$ or less.

13. The contact lens according to claim 1, wherein a prism ballast shape is set for a lens front surface and a lens back surface.

14. The contact lens according to claim 1, wherein the first to third thick parts and the upper and lower thin parts have a linearly symmetrical shape in relation to a vertical diametrical line in the worn state.

15. The contact lens according to claim 1, wherein the contact lens is any of a toric lens, a bifocal lens, a multifocal lens, a color contact lens, or a myopia progression suppression lens.

16. A contact lens set including a plurality of contact lenses according to claim 1 which are assorted by different spherical lens powers set for the optical zones thereof, the contact lens set being characterized in that: a prism ballast shape is set for lens front surfaces and lens back surfaces of the contact lenses, and a prism amount is set to be greater corresponding to the spherical lens powers of the optical zones being greater at a minus side.

* * * * *